United States Patent [19]

Ibe et al.

[11] Patent Number: 4,753,850
[45] Date of Patent: Jun. 28, 1988

[54] FIBER-REINFORCED LAMINATES AND METHOD FOR MAKING THEM

[75] Inventors: Gerhard Ibe, Königswinter; Wolfgang Gruhl, Bonn-Holzlar, both of Fed. Rep. of Germany

[73] Assignee: Vereingte Aluminium -Werke A.G., Fed. Rep. of Germany

[21] Appl. No.: 104,552

[22] Filed: Sep. 30, 1987

Related U.S. Application Data

[63] Continuation of Ser. No. 789,346, Oct. 21, 1985, abandoned, which is a continuation of Ser. No. 526,502, Aug. 25, 1983, abandoned, which is a continuation-in-part of Ser. No. 222,657, Jan. 5, 1981, abandoned.

[30] Foreign Application Priority Data

Jan. 4, 1980 [DE] Fed. Rep. of Germany ....... 3000171

[51] Int. Cl.$^4$ ............................................. B32B 15/14
[52] U.S. Cl. .................................. 428/608; 428/614; 428/654
[58] Field of Search ............. 428/611, 614, 627, 635, 428/650–654, 939, 608; 228/117

[56] References Cited

U.S. PATENT DOCUMENTS

| | | | |
|---|---|---|---|
| 3,169,048 | 2/1965 | McGinn | 228/56 R |
| 3,395,001 | 7/1968 | Stroup et al. | 228/208 |
| 3,606,667 | 9/1971 | Kreider | 428/937 |
| 3,615,277 | 10/1971 | Kreider et al. | 428/654 |
| 3,649,425 | 3/1972 | Alexander | 428/684 |
| 3,900,150 | 8/1975 | Delgrosso et al. | 428/654 |
| 3,936,277 | 2/1976 | Jakway et al. | 428/941 |
| 3,970,237 | 7/1976 | Dockus | 228/208 |
| 3,984,043 | 10/1976 | Kreider et al. | 228/190 |
| 4,010,884 | 3/1977 | Rothman | 428/635 |
| 4,141,802 | 2/1979 | Duparque et al. | 428/608 |
| 4,146,164 | 3/1979 | Anderson et al. | 428/654 |
| 4,241,148 | 12/1980 | Schoer et al. | 428/654 |
| 4,260,441 | 4/1981 | Prewo | 428/593 |
| 4,411,380 | 10/1983 | McWithey et al. | 428/593 |

FOREIGN PATENT DOCUMENTS

| | | | |
|---|---|---|---|
| 84919 | 8/1983 | European Pat. Off. | 228/117 |
| 2330336 | 1/1975 | Fed. Rep. of Germany . | |
| 2657685 | 3/1978 | Fed. Rep. of Germany . | |
| 2756014 | 6/1978 | Fed. Rep. of Germany . | |
| 2133316 | 11/1972 | France . | |
| 3880572 | 12/1972 | Japan . | |
| 5650673 | 8/1973 | Japan . | |
| 7615176 | 1/1976 | Japan . | |
| 7756076 | 7/1976 | Japan . | |
| 238326 | 4/1978 | U.S.S.R. | 228/208 |

OTHER PUBLICATIONS

Henderson, J. G., et al; *Metallurgical Dictionary*, Reinhold Pub. Corp., New York, N.Y., pp. 296–297 TN 609Hy (1953).

Kreider, K. G. et al; *Plasma Sprayed Metal Matrix Fiber Reinforced Composites;* Air Force Mat'ls. Lab, Tech. Report AFML-TR68-119, pp. 1–11 (1968).

Harrigan, W. C., et al. *J. Metals* 20 (May 1975).

*Primary Examiner*—John J. Zimmerman
*Attorney, Agent, or Firm*—Darby & Darby

[57] ABSTRACT

A fiber reinforced metal laminate and method of preparation. The metal layers are of aluminum or aluminum alloy. An aluminum containing solder layer is disposed on inner surfaces of the metal layers. The fibers are silicone-carbide, boron or silicon-carbide coated boron and located between the solder layers. These layers are heated under pressure to a temperature above the melting point of the solder and below the melting point of the metal layer.

9 Claims, 3 Drawing Sheets

FIBER-REINFORCED LAMINATES AND METHOD FOR MAKING THEM

This is a continuation of application Ser. No. 789,346 filed Oct. 21, 1985, abandoned, which is a continuation of application Ser. No. 526,502 filed Aug. 25, 1983, now abandoned, which is a continuation-in-part of application Ser. No. 222,657 filed Jan. 5, 1981, now abandoned.

The present invention relates to fiber-reinforced laminates consisting of at least two aluminum or aluminum alloy metal layers and interposed fiber webs or mats, as well as a method for making such laminates.

Fiber-reinforced thin tapes, or sheets, of aluminum alloy, including up to 50 volume % boron fibers partially coated with Silicon Carbide, are currently produced by the plasma spraying method. In this method, a layer of fibers wound onto a drum is fixed onto an aluminum foil lying underneath the fibers by plasma spraying a layer of aluminum deposit. The sprayed layer is very porous and must be additionally consolidated, generally by hot rolling or hot pressing. Moreover, during the plasma spraying process, the fibers are subject to considerable thermal and mechanical stress through contact with the droplets of aluminum in the plasma stream, which reach temperatures of up to 2000° C. This can cause damage to the fibers and to the laminations during production. In addition, the tapes so produced have a final length limited by the circumference of the drum. Furthermore, this method is discontinuous and requires considerable capital expense.

An object of the present invention is to develop a fiber-reinforced laminate and method for manufacturing such a laminate which avoids the drawbacks mentioned above. The disclosed method will not cause any thermal or mechanical damage to the fibers, will be compatible with general processes for semifinished product production and will be suited for adaptation to a continuous process.

According to the invention, these objects are achieved when the lamination of metal layers and interposed fibers contains an aluminum solder, preferably plated onto one or both sides of the metal layers. Such a solder usually consists of an aluminum-silicon alloy having a silicon content of from about 5 to about 12% by weight; surface-active metals such as Bismuth, Barium, Beryllium, Sodium, Potassium, Lithium, Calcium, Strontium and Antimony are generally added to impart wetting powers.

According to a preferred embodiment of the invention, the thickness of the solder plating is between about 3 and about 10% of the thickness of the metal layer. The metal layer itself can consist of standardized AlMn 1; the thickness of each metal layer is generally between about 0.1 and 2mm and the aluminum-silicon solder is preferably coated to a thickness of about 10% thereof. The metal layers may include iron and/or nickel up to about 3% by weight and chrome, titanium, zirconium, cobalt, vanadium, and molybdenum individually up to about 1% by weight or a mixture of such elements totalling up to 1% by weight.

The fiber material is preferably a silicon carbide. However, boron fibers with or without a silicon carbide coating can be used instead. The fibers are used in the form of fiber webs or fiber mats arranged essentially in parallel with one another. In addition, several tests have shown that the stiffness values of a laminated material according to our invention are particularly favorable when its center has a non-reinforced core of aluminum or an alloy of aluminum.

The production of a laminate according to the invention takes place under slight pressure at temperatures which lie above the melting point of the solder and below the softening point of the metal layers. These conditions can be maintained by hot pressing or hot rolling the laminated material in the temperature range of between about 450° and about 650° C.

It is possible to heat the metal layers, interposed fibers and aluminum solder of the laminate to temperatures above the melting point of the solder, prior to the rolling step, and then roll the laminate materials with unheated cylinders. Numerous tests have shown that it is preferable to perform the rolling process, i.e. the actual joining with unheated rolls. In this manner, a high rate of cooling occurs during production of the laminate. The preheated starting materials are pressed together and joined in the first part of the rolling process, while at the same time the rolls effect cooling of the laminate via its metal layers into the laminate joining zone. This enables the finished laminate product to be further processed immediately after leaving the roll gap.

It is important that the composite material of the laminate reach the prescribed temperature range prior to entering the roll gap. These materials, the aluminum solder alloy, fiber web and metal layers, are preferably brought together by rolling; the starting materials may first be separately pre-heated to a temperature below the melting point of the solder. Immediately prior to lamination rolling, they are then brought in contact, preferably in a continuous oven and heated to the required end temperature. After the actual joining process, the lamination can be further consolidated by additional rolling at temperatures below the melting point of the solder. This additional consolidation leads to particularly firm and compact end products.

It is of further advantage to anneal the laminate prior to heat treatment above the melting point of the solder. It was found that annealing is particularly effective when carried out at temperatures of between about 10° and about 50° C. below the melting point of the solder, for an annealing time of about 2 to 12 hours.

The laminated bond can be produced by bringing together the metal layers, the aluminum solder alloy and the fiber web by means of rolls and reels and their heating. It is also possible to first heat the starting material separately and to then heat the same to above the melting point of the solder directly before rolling.

The aluminum solder alloy can serve as an antioxidant and an adhesion-imparting agent during the production of the laminate. The laminate can be produced without any appreciable deformation of the core sheets and the bond between the metal layers and the fibers formed by the fiber mat impregnated with the layer of solder. The lamination is preferably rolled down to about 0.5–1.5% reduction of the original thickness.

Where a high temperature-resistant laminate of aluminum is desired, it is preferable to embed the fiber material in the metal layers by a plastic deformation of the latter. To that end, the lamination is rolled down to between about 1.5 and about 10% reduction of its original thickness.

It is particularly advantageous to use an AlSi alloy containing about 5 to about 12% silicon by weight as the plating layer. A nearly complete union of the metal layers occurs when nearly eutectic AlSi alloys having about 10 to about 12% Si by weight are preferably used.

Moreover, the boundary layer between the metal plate and the solder plating is practically free of oxides. The thickness of the plating layer is preferably about 3 to about 10% of the thickness of the metal layer. The liquid solder encloses the fibers during hot pressing and thus prevents further access of air and consequent new oxidation of the metal surfaces.

In principle, all ceramic, inorganic or metallic fibers or carbon fibers with clear reinforcing properties and sufficient thermal and chemical resistance can be used for the fiber-reinforced laminate according to the invention. If is preferable, however, to use SiC fibers or boron fibers with or without SiC coating as the fibers for the laminate. Use of these fibers assures a complete metallurgical union of the metal layers and a complete enclosure and adhesion of the fibers within the laminate after the latter has cooled down. In the edge zones between the metal layers and fibers a micrograph or an analytical examination shows, by way of differing concentration distribution even after complete fusion, the original presence of a plating layer.

The laminate can have a reinforced construction. It can be provided with layers of aluminum or aluminum alloys solder-plated on one or both sides thereof. The fiber layers or fiber webs or fiber mats can consist of long or short fibers and be disposed with parallel or angular arrangement of the fibers. However, a parallel arrangement has advantages with regard to firmness and bending loads.

In order to increase the bending resistance of the laminate, it is preferable that a laminate of several layers have in its center a non-reinforced core of aluminum or an aluminum alloy. The non-reinforced core has, preferably, a thickness of about 30% the total thickness of the laminate.

In the production of the laminate according to the invention, hot pressing of parallel fiber layers, fiber webs or fiber mats between metal layers preferably occurs at temperatures of up to about 650° C. Higher temperatures can cause fusion of the metal layers. Various investigations have shown a minimum processing temperature of about 450° C. The plasticity of the material below this temperature is too low to achieve adequate adhesion and re-formation of the individual layers with one another. It is of particular advantage with the preferred AlSi solders to use a temperature range of between about 590° and about 620° C. since in this range the sheets are sufficiently plastic, while the thermal and mechanical stresses of the fibers during processing are minimized.

Preferably, hot pressing takes place at pressures below 50 bars. Numerous tests have shown that with large-surface parts, more effective adhesion is achieved if these relatively low pressures are used and further consolidation by hot or un-heated cylinder rolling takes place subsequently.

In a preferred embodiment of the invention, the laminate is subjected to an annealing treatment prior to the heat treatment above the melting point of the solder. This results in better distribution by diffusion of the main alloying element of the solder, silicon for example, so as to result in a homogeneous composite material having improved processing properties. Preferably, the annealing temperatures lie about 10° to about 50° C. below the melting point of the solder so as to ensure against any undesirable fusion of the solder.

Hot-pressing can be effected in a vacuum, under a protective gas atmosphere, or in air. When hot-pressing under air, the sheets must first be freed from excessive oxide films by a chemical treatment. The plastic deformation caused by pressing the aluminum between the fibers will cause an approximately 50%-enlargement of the metal surface so that the new oxide-free surface areas weld with one another and firmly adhere to the fibers. The remaining 50% of the surface of the aluminum sheets is subjected to the action of the solder plating layer so as to result in a 100%-adhesion between the sheets and the embedded fibers.

An improvement of the hot processing properties of the laminate according to the invention can be achieved by annealing the laminate. With this treatment, any solder coating still remaining after the hot-pressing is eliminated by a homogenizing diffusion of the excess alloying components into the metal layers. This homogenization is continued at a temperature below the melting point of the solder until excess alloying components of the solder layer have migrated into the metal layers. In the case of an AlSi solder, this means that excess silicon components diffuse away so that at no point of the bond can an excessive drop of the melting point of the aluminum through silicon be found.

A laminate treated in the above manner can be heat-treated during subsequent use, e.g. hot forming, hard-soldering or welding, without any molten phase occurring in the fiber-reinforced laminate itself.

The foregoing description, as well as further objects, features and advantages of the present invention, will be more completely understood from the following detailed description of presently preferred, but nonetheless illustrative embodiments in accordance with the present invention, with reference being had to the accompanying drawings, wherein.

Figure 1:
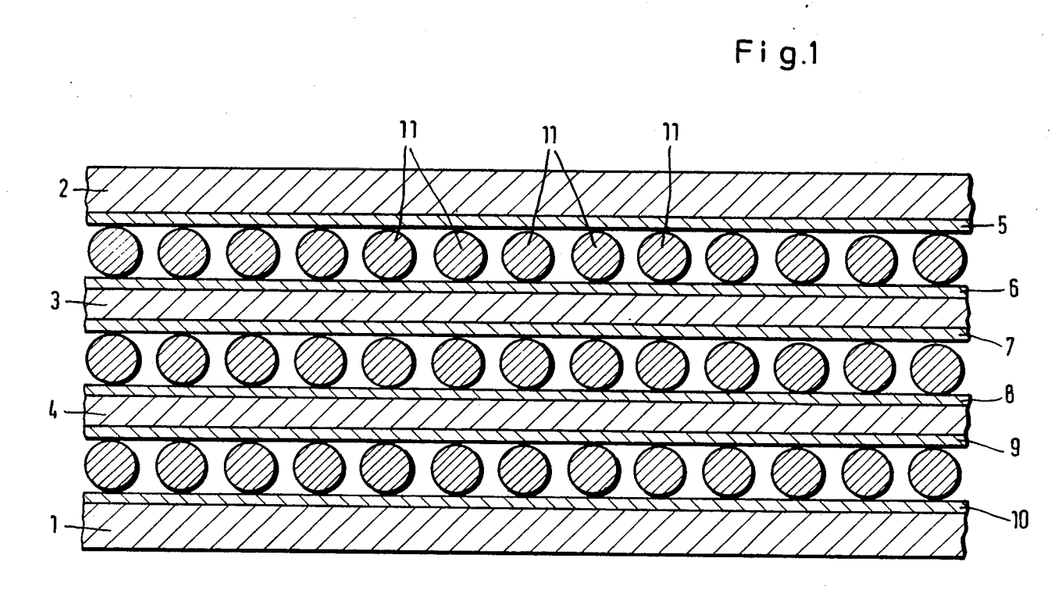
FIG. 1 shows a composite material put together in accordance with the invention and prior to being bonded by hot pressing or hot rolling.

FIG. 1 shows a three-layer fiber-reinforced laminate in a preferred form of the invention. It consists of bottom sheet 1 and cover sheet 2, each having a thickness of about 0.3 mm and composed of the material AlMn 1, having a manganese content of between about 0.9 and 1.4% by weight. Both sheets are clad on one side with about 10% of an AlSi 12-solder having a silicon content of about 12% by weight. Two intermediary sheets 3, 4 are provided. These sheets 3,4 also consist of AlMn 1 and are clad on both sides with an AlSi 12-solder. The solders plated onto the sheets 5, 6, 7, 8, 9, 10 are of the same thickness and make up about 10% of the thickness of the sheets.

Interposed between the plated layers 5, 6, 7, 8, 9, 10 are three layers of SiC-fibers 11 of about 100 $\mu$m thickness each. The composite sheet of FIG. 1 was made up from degreased and pickled sheets and degreased fiber web layers and inserted into a compression mold that had been heated to 600° C. The mold was closed with a pressure of about 28 N/mm² on the sample. Heating was discontinued after about 15 seconds and the pressure was disconnected after the temperature had dropped to about 500° C.

Figure 2:
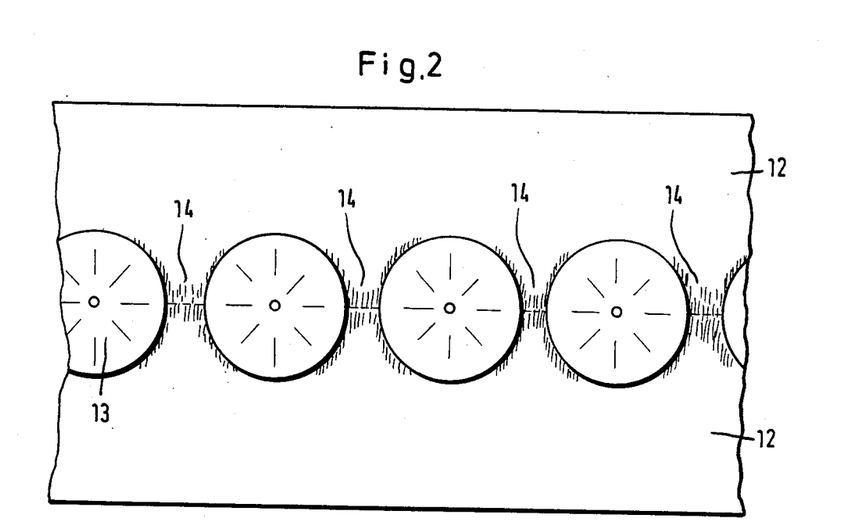
FIG. 2 shows a laminate in accordance with the invention after hot pressing or hot rolling.

FIG. 2 shows the structure of this sample in a metallographic micrograph. It shows thorough welding together of sheets 12 and the complete envelopment of fibers 13. Between the fibers there are still small areas of solidified AlSi-eutectic from the remainder of solder layer 14. These eutectic remainders can be eliminated, for example by diffusion annealing of the sample at about 500° C. at an annealing time of about 4 hours, since the excess Si from the residual solder will diffuse into the surrounding sheet.

Figure 3:
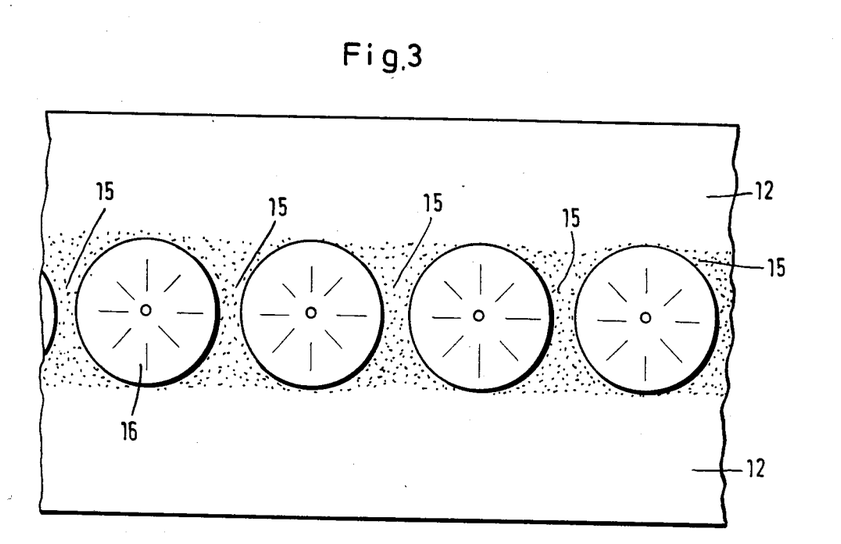
FIG. 3 shows a laminate in accordance with the invention after a subsequent annealing.

FIG. 3 shows the same micrograph after annealing. The areas of residual eutectic between fibers 16 have disappeared. Instead, a zone of homogeneous structure 15, which contains only weak enrichments of residual silicon, has formed.

Figure 4:
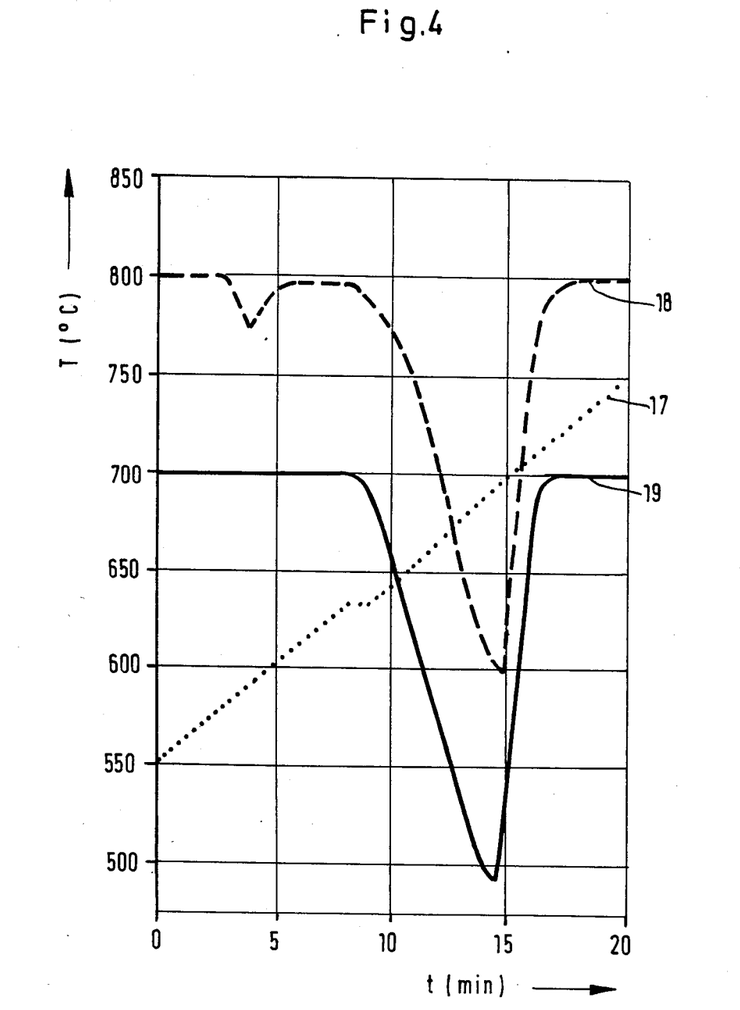
FIG. 4 shows a diagram of two temperature difference measurements.

This process can be quantitatively proved by means of differential thermal analysis (DTA). With linear heating of a composite lamination material, produced as illustrated in FIG. 2, a slight deflection is shown (at about 573° C.) in the temperature difference course 18 against a similarly heated comparison sample of pure aluminum, which corresponds to the melting of the remainder of the eutectic Al-Si solder alloy. This is illustrated in FIG. 4, the temperature course over the heating time being given as dotted line 17. At about 642° C., the melting of the AlMn alloy of the sheets begins with a large deflection in the ΔT-curve.

Curve 19 shows a composite lamination material after diffusion annealing for 4 hours at 500° C. (see FIG. 3). It no longer shows the deflection at 573° C., i.e. after this heat treatment there no longer are any premature fusions before the melting of the sheets. After annealing, the material can again be hard-soldered or otherwise hot worked.

In the following example of unheated cylinder rolling, according to the invention is given, the metal layers are each provided with one solder plating.

Two freshly pickled sheets of AlMn 1 of a thickness of 1 mm are solder plated on one side with 10% AlSi 10. The AlSi 10 solder has a silicon content of about 10% by weight. The dimensions of the sheets are 70×190 mm². Between these sheets, a piece of fiber web of the same dimensions and composed of SiC-fibers of 140 μm thickness is placed. The SiC-fibers are held together by thin aluminum warp threads (12 in FIG. 1) of a dimension of 50×400 μm² spaced about 2.8 mm from each other.

The solder plated sheets are directed with the solder layer toward the fiber web. Prior to rolling, the front sides of the samples are welded with one another and the welding seam slightly pointed so as to allow easy insertion of the sample into the roll gap. The second end of the samples is held together by a thin aluminum wire.

With some aluminum alloys it is difficult to set the proper soldering temperature since the melting points of soldering material and base material are nearly the same. In these cases, the starting materials should be fed separately into the rollers, the unplated sheets being heated to a lesser degree than the aluminum solder alloy. The soldering temperature is reached only shortly before or during the rolling. A similar procedure should be followed when only one of the metal layers is solder-plated.

When using solder-plated sheets of AlMn 1, the Sample is heated in an electrically pre-heated air-circulation oven to about 630° C., taken from the oven and immediately introduced into an already running roller. In passing through the rolls, the fiber mat is impregnated with solder and excess solder is squeezed out of the sample. In this case, the rolling pressure is set so that no appreciable reduction or extension of the core sheets occurs.

In order to maintain a uniform roll temperature, the rolls must be cooled. Due to the relatively low rolling temperature, the residual solder of the composite material solidifies again right after leaving the rolls.

When increasing the degree of rolling, the core sheets are deformed and extended over their entire cross section. These sheets shift under a more substantial deformation with respect to the rigid and high-strength SiC-fibers, which are practically undeformable. This causes a shear deformation, desired in order to join the fibers and sheets more intimately with each other and thus improve the adhesion. With excessive shear deformation, i.e., too high a degree of rolling, large tangential stresses occur which can cause tearing of the fibers. The rolling degree, however, should be sufficient to break up the aluminum oxide surface layer of the sheets and to expose sufficient fresh, uncontaminated (oxide-free) sheet surface, so that the bonding between the sheets and the fibers will be strong. The optimum rolling degree should thus be between about 1.5 and about 10%. The accompanying enlargement of the interface can be up to 100 times.

The solder acts as a seal of the freshly exposed oxide-free sheet surface, preventing contamination with oxygen (and formation of aluminum oxide) more effectively than the highest technical vacuum.

According to the above preferred method, samples have been prepared, having about 15.6 to 17.8% elongation. X-ray examination showed periodically torn fibers at distances of about 3 mm from one another. On the other hand, samples with only about 0.9 to 3.2% elongation showed very good adhesion with no tearing of the fibers.

To improve the mechanical properties of the core material, and particularly to improve the dimensional stability under heat and/or the mechanical behavior under heat, the alloy of the metal layers can additionally contain iron and/or nickel up to about 3% and up to about 1% chrome, titanium, zirconium, cobalt, vanadium or molybdenum individually or in combination with other elements that increase dimensional stability under heat.

Although preferred embodiments of the invention have been disclosed for illustrative purposes, it will be appreciated by those skilled in the art that many additions, modifications, and substitutions are possible without departing from the scope and spirit of the invention as defined in the accompanying claims.

What is claimed is:

1. A composite comprising at least two opposing aluminum-containing metal layers, at least two layers of aluminum-containing solder having a melting point below the softening point of said metal layers, said solder being roll-plated to at least one side of said metal layers, the degree of said rolling being sufficient to break up an aluminum oxide layer present on the surface of said metal layers and to expose sufficient oxide-free surface so that the bonding between said metal layers and said solder layers presents a higher degree of adhesion than that achievable by use of vacuum or protective atmosphere, and a layer comprising a plurality of fibers disposed between two layers of said solder, the composite being bonded together by hot-rolling conducted at a temperature above the melting point of said solder and below the softening point of said metal layers in the absence of an inert atmosphere.

2. A composite as defined in claim 1 wherein said fibers are selected from the group consisting of silicon carbide fibers, boron fibers, and silicon carbide coated boron fibers.

3. A composite as defined in claim 1 wherein said metal layers comprise an aluminum alloy including from about 0 to about 2.5% by weight manganese and from about 0 to about 2.5% by weight magnesium.

4. A composite as defined in claim 2 wherein said solder comprises an aluminum-silicon alloy.

5. A composite as defined in claim 4 wherein the aluminum-silicon alloy solder comprises from about 5 to about 12% by weight silicon and from about 0 to about 10% by weight of a surface active metal selected from the group consisting of barium, beryllium, bismuth, calcium, lithium, potassium, and sodium.

6. A composite as defined in claim 5 wherein the metal layers have a thickness of from about 0.1 to about 2 mm and the aluminum-silicon alloy solder has a thickness of about 10% of the thickness of the metal layer.

7. A composite as defined in claim 6 wherein the metal layer further includes between 0 and about 0.5% by weight silicon, between 0 and about 3% by weight of a metal selected from the group consisting of iron and nickel and from about 0 to about 1% by weight of at least one metal selected from the group consisting of chromium, titanium, zirconium, cobalt vanadium, and molybdenum.

8. A composite as defined in claim 1 wherein the fibers are disposed in a parallel arrangement with one another or in the form of a web or mat in which the fibers are also arranged in parallel and are fixed in position by thin aluminum wires (12).

9. The product of claim 1 said composite having been subjected to an annealing treatment at a temperature below the melting point of the solder.

* * * * *

UNITED STATES PATENT AND TRADEMARK OFFICE
CERTIFICATE OF CORRECTION

PATENT NO. : 4,753,850

DATED : June 28, 1988

INVENTOR(S) : GERHARD IBE and WOLFGANG GRUHL

It is certified that error appears in the above-identified patent and that said Letters Patent is hereby corrected as shown below:

The title page showing the illustrative figure should be deleted to appear as per attached title page.

In the drawings, Sheet 1 of 3, consisting of Fig. 1, should be deleted to be replaced with Sheet 1 of 3 (Fig. 1) as shown on the attached sheet.

Column 5, line 44, change "12" to --12'--

Column 8, line 15, change "12" to --12'--

Signed and Sealed this

Twenty-sixth Day of November, 1991

*Attest:*

HARRY F. MANBECK, JR.

*Attesting Officer*      *Commissioner of Patents and Trademarks*

United States Patent

Ibe et al.

[11] Patent Number: 4,753,850
[45] Date of Patent: Jun. 28, 1988

[54] FIBER-REINFORCED LAMINATES AND METHOD FOR MAKING THEM

[75] Inventors: Gerhard Ibe, Königswinter; Wolfgang Gruhl, Bonn-Holzlar, both of Fed. Rep. of Germany

[73] Assignee: Vereingte Aluminium-Werke A.G., Fed. Rep. of Germany

[21] Appl. No.: 104,552

[22] Filed: Sep. 30, 1987

Related U.S. Application Data

[63] Continuation of Ser. No. 789,346, Oct. 21, 1985, abandoned, which is a continuation of Ser. No. 526,502, Aug. 25, 1983, abandoned, which is a continuation-in-part of Ser. No. 222,657, Jan. 5, 1981, abandoned.

[30] Foreign Application Priority Data

Jan. 4, 1980 [DE] Fed. Rep. of Germany ........ 3000171

[51] Int. Cl.$^4$ .................................................. B32B 15/14
[52] U.S. Cl. ................................. 428/608; 428/614; 428/654
[58] Field of Search ............. 428/611, 614, 627, 635, 428/650–654, 939, 608; 228/117

[56] References Cited

U.S. PATENT DOCUMENTS

| | | | |
|---|---|---|---|
| 3,169,048 | 2/1965 | McGinn | 228/56 R |
| 3,395,001 | 7/1968 | Stroup et al. | 228/208 |
| 3,606,667 | 9/1971 | Kreider | 428/937 |
| 3,615,277 | 10/1971 | Kreider et al. | 428/654 |
| 3,649,425 | 3/1972 | Alexander | 428/684 |
| 3,900,150 | 8/1975 | Delgrosso et al. | 428/654 |
| 3,936,277 | 2/1976 | Jakway et al. | 428/941 |
| 3,970,237 | 7/1976 | Dockus | 228/208 |
| 3,984,043 | 10/1976 | Kreider et al. | 228/190 |
| 4,010,884 | 3/1977 | Rothman | 428/635 |
| 4,141,802 | 2/1979 | Duparque et al. | 428/608 |
| 4,146,164 | 3/1979 | Anderson et al. | 428/654 |
| 4,241,148 | 12/1980 | Schoer et al. | 428/654 |
| 4,260,441 | 4/1981 | Prewo | 428/593 |
| 4,411,380 | 10/1983 | McWithey et al. | 428/593 |

FOREIGN PATENT DOCUMENTS

| | | | |
|---|---|---|---|
| 84919 | 8/1983 | European Pat. Off. | 228/117 |
| 2330336 | 1/1975 | Fed. Rep. of Germany . | |
| 2657685 | 3/1978 | Fed. Rep. of Germany . | |
| 2756014 | 6/1978 | Fed. Rep. of Germany . | |
| 2133316 | 11/1972 | France . | |
| 3880572 | 12/1972 | Japan . | |
| 5650673 | 8/1973 | Japan . | |
| 7615176 | 1/1976 | Japan . | |
| 7756076 | 7/1976 | Japan . | |
| 238326 | 4/1978 | U.S.S.R. | 228/208 |

OTHER PUBLICATIONS

Henderson, J. G., et al; *Metallurgical Dictionary*, Reinhold Pub. Corp., New York, N.Y., pp. 296–297 TN 609Hy (1953).
Kreider, K. G. et al; *Plasma Sprayed Metal Matrix Fiber Reinforced Composites*; Air Force Mat'ls. Lab, Tech. Report AFML-TR68-119, pp. 1–11 (1968).
Harrigan, W. C., et al. *J. Metals* 20 (May 1975).

Primary Examiner—John J. Zimmerman
Attorney, Agent, or Firm—Darby & Darby

[57] ABSTRACT

A fiber reinforced metal laminate and method of preparation. The metal layers are of aluminum or aluminum alloy. An aluminum containing solder layer is disposed on inner surfaces of the metal layers. The fibers are silicone-carbide, boron or silicon-carbide coated boron and located between the solder layers. These layers are heated under pressure to a temperature above the melting point of the solder and below the melting point of the metal layer.

9 Claims, 3 Drawing Sheets

FIG. 1